(12) United States Patent
Chou

(10) Patent No.: US 6,682,240 B1
(45) Date of Patent: Jan. 27, 2004

(54) SELF-POSITIONING DEVICE FOR A KEYBOARD

(75) Inventor: Kuan-Nan Chou, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 0 days.

(21) Appl. No.: 10/370,475

(22) Filed: Feb. 24, 2003

(51) Int. Cl.[7] ................................. B41J 29/02
(52) U.S. Cl. .............. 400/691; 400/693; 400/472; 248/456; 248/188.2; 248/918; 248/188.1; 248/188.6; 248/188.8; 108/7; 108/9; 403/326; 403/329
(58) Field of Search ................ 400/691, 693, 400/472; 248/456, 188.2, 918, 188.1, 188.6, 188.8; 108/7, 9; 403/326, 329

(56) References Cited

U.S. PATENT DOCUMENTS

| | | | | |
|---|---|---|---|---|
| 4,516,508 A | * | 5/1985 | Kako et al. ................... 108/7 |
| 4,693,444 A | * | 9/1987 | Williams et al. ............. 248/653 |
| 4,735,394 A | * | 4/1988 | Facco .......................... 248/653 |
| 4,773,783 A | * | 9/1988 | Dickie ......................... 400/682 |
| 5,297,003 A | * | 3/1994 | Nomura et al. .............. 361/680 |
| 5,469,327 A | * | 11/1995 | Cheng .......................... 361/680 |
| 5,567,067 A | * | 10/1996 | Ambrose ..................... 400/472 |
| 5,732,928 A | * | 3/1998 | Chang .......................... 248/688 |
| 6,097,592 A | * | 8/2000 | Seo et al. .................... 361/683 |
| 6,485,209 B2 | * | 11/2002 | Oura et al. .................. 400/681 |
| 6,498,720 B2 | * | 12/2002 | Glad ............................ 361/680 |
| 6,538,642 B2 | * | 3/2003 | Tsai ............................. 345/168 |
| 6,543,949 B1 | * | 4/2003 | Ritchey et al. ............. 400/691 |

* cited by examiner

*Primary Examiner*—Andrew H. Hirshfield
*Assistant Examiner*—Andrea H. Evans
(74) *Attorney, Agent, or Firm*—Rosenberg, Klein & Lee

(57) ABSTRACT

A self-positioning device for a keyboard includes two protrusions adapted to be respectively formed on opposite sides of a corresponding leg, two stops each formed on a corresponding one of the protrusions, and two sectorial bosses adapted to be formed on a corresponding one of the recessed seats to correspond to the two protrusions. Each sectorial boss has a first edge and a second edge to selectively abut a corresponding one of the two stops. The selective abutting of the stops to the first and second edges enables support of the keyboard on a plan surface horizontally and inclinedly.

8 Claims, 7 Drawing Sheets

SELF-POSITIONING DEVICE FOR A KEYBOARD

BACKGROUND OF THE INVENTION

1. Field of the Invention

The present invention relates to a self-positioning device for a keyboard, and more particularly to two protrusions oppositely extending from a side of a leg of the keyboard and two sectorial bosses respectively and oppositely adapted to be formed on a recess defined in a bottom face of the keyboard. Each protrusion has a stop integrally formed on the protrusion to correspond to one of the two sectorial bosses. Each of the protrusions is formed on a resilient plate so that when the leg is moved relative to the keyboard, the resilience provided by the resilient plates enables the stop to slide over a corresponding one of the sectorial bosses. After the stop slides over the corresponding sectorial boss, the recoil force from the resilient plate springs the stop to securely abut a side of the sectorial boss so as to position the leg.

2. Description of Related Art

A computer keyboard is equipped with two legs respectively provided on edges of the rear side of the keyboard to support the keyboard in a horizontal or an inclined position. When the legs are received in the corresponding recess in the rear side of the keyboard, the keyboard stands horizontally on a plan surface. When the legs are moved relative to the keyboard, the keyboard stands inclinedly relative to a plan surface to support the keyboard such that after the keyboard is elevated, the user is able to operate the keyboard easily and the user's wrist and muscle will thus be protected from injury due to excessive effort to maintain the wrist and the wrist joint at a fixed position.

With reference to FIG. 6, a conventional positioning device for a keyboard is shown and has a leg (30) and a base (40).

The leg (30) includes two pivots (31) extending toward opposite directions and an extension (32) integrally extending between the two pivots (31).

The base (40) includes a recessed seat (41), two cutouts (42) defined in two opposite sidewalls of the base (40) to correspond to the two pivots (31) and a stop (43) formed on a bottom face defining the recessed seat (41) and between the two cutouts (42) to correspond to the extension (32).

When the leg (30) is to be assembled with the base (40), the leg (30) is first placed in the recessed seat (41) and then each of the two pivots (31) is inserted into a corresponding one of the two cutouts (42). Because the extension (32) is formed between the two pivots (31), which gives the two pivots (31) resilience when inserted into the cutouts (42) such that after the two pivots (31) are inserted into the corresponding cutouts (42), the leg (30) is able to pivot relative to the base (40). However, when the leg (30) pivots, the extension (32) abuts the stop (43) so as to support the keyboard to stand inclinedly relative to a plan surface.

Reviewing the conventional positioning device, it is to be noted that when the dimension of the cutouts (42) does not fit the dimension of the pivots (31), the user may have to apply a lot of effort trying to pivot the leg (30). Further, when the leg (30) is to be folded in the recessed seat (41), the stop (43) abutting the extension (32) creates a resistance against the effort to fold the leg (30).

To overcome the shortcomings, the present invention tends to provide an improved self-positioning device for a keyboard to mitigate and obviate the aforementioned problems.

SUMMARY OF THE INVENTION

The primary objective of the present invention is to provide an improved self-positioning device which includes two protrusions oppositely extending from a side of a leg of the keyboard and two sectorial bosses respectively and oppositely adapted to be formed on a recess defined in a bottom face of the keyboard. Each protrusion has a stop integrally formed on the protrusion to correspond to one of the two sectorial bosses. Each of the protrusions is formed on a resilient plate so that when the leg is moved relative to the keyboard, the resilience provided by the resilient plates enables the stop to slide over a corresponding one of the sectorial bosses. After the stop slides over the corresponding sectorial boss, the recoil force from the resilient plate springs the stop to securely abut a side of the sectorial boss so as to position the leg.

This invention also provides a self-positioning device for a keyboard having a base with two recessed seats to respectively and pivotally receive therein a leg so as to support the keyboard on a plan surface horizontally or inclinedly, the self-positioning device comprising two protrusions respectively formed on opposite sides of a corresponding one of the two recessed seats; two stops each formed on a corresponding one of the protrusions; and two sectorial bosses adapted to be formed on a corresponding one of the legs to correspond to the two protrusions, each sectorial boss having a first edge and a second edge to selectively abut a corresponding one of the two stops, whereby the selective abutting of the stops to the first and second edges enables support of the keyboard on a plan surface horizontally and inclindedly. The self positioning device further comprises two resilient plates each formed on opposite sides of the leg, wherein each of the two sectorial bosses is formed on a corresponding one of the resilient plates. The self positioning device further comprises two through holes defined in a corresponding one of the legs to correspond to the two protrusions so as to allow extension of the two protrusions into the corresponding through holes.

Other objects, advantages and novel features of the invention will become more apparent from the following detailed description when taken in conjunction with the accompanying drawings.

DETAILED DESCRIPTION OF THE PREFERRED EMBODIMENT

Figure 1:
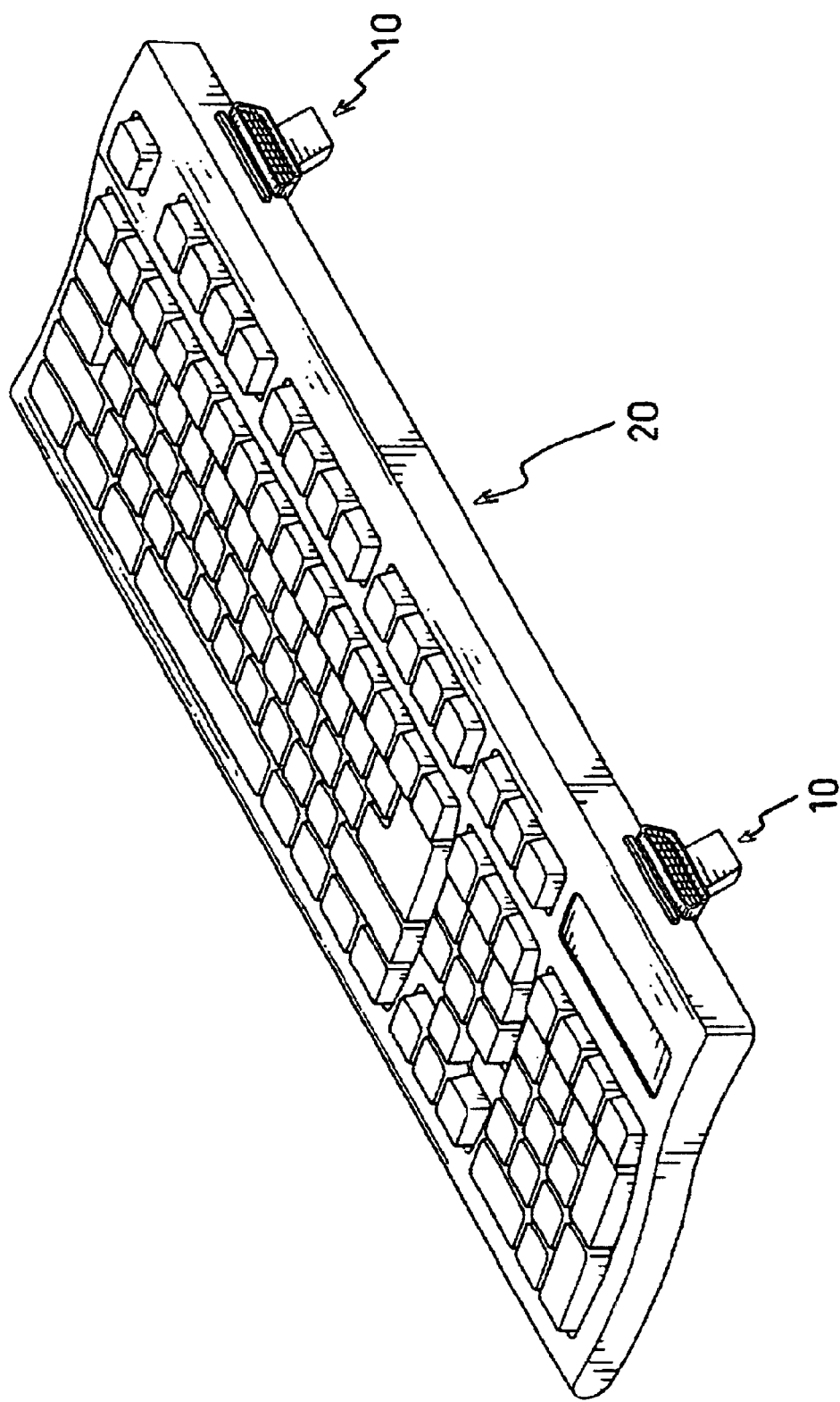
FIG. 1 is a perspective view of a keyboard with the self-positioning device of the present invention.
Figure 2:
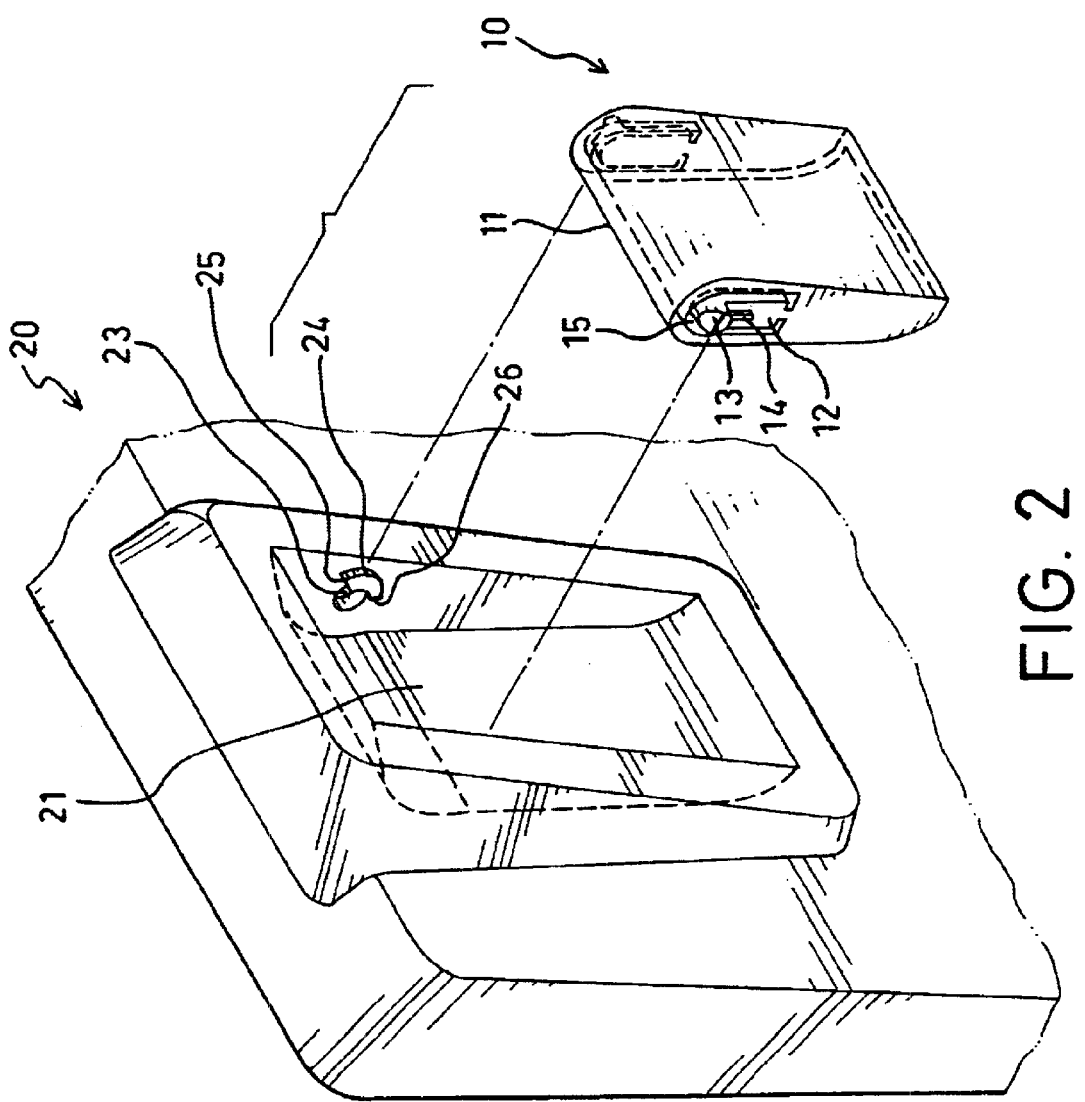
FIG. 2 is an exploded perspective view of the self-positioning device of the present invention.

With reference to FIGS. 1 and 2, a keyboard has two legs (10) and a base (20). with the two legs (10) pivotally mounted on one side of the base (20) so as to support the keyboard on a plan surface horizontally or inclinedly.

The self-positioning device in accordance with the present invention includes two resilient plates (12) respectively formed on opposite sides of the leg (10), two protrusions (13) each formed on a corresponding one of the resilient plates (12) and two stops (14) each formed on a corresponding one of the protrusions (13) each resilient plate (12) being defined by a recess (15). Furthermore, the self-positioning device includes two pairs of through holes (23) each defined in a respective one of two recessed seats (21) of the base (20) and two pairs of sectorial bosses (24) each formed in a corresponding one of the recessed seats (21).

It is noted that the base (20) has two recessed seats (21) and each recessed seat (21) has two through holes (23) oppositely defined through a side face defining the recessed seat (21). Each one of the sectorial bosses (24) is formed beside a corresponding one of the through holes (23) of the recessed seat (21). Each sectorial boss (24) has a first edge (25) and a second edge (26).

Figure 3:
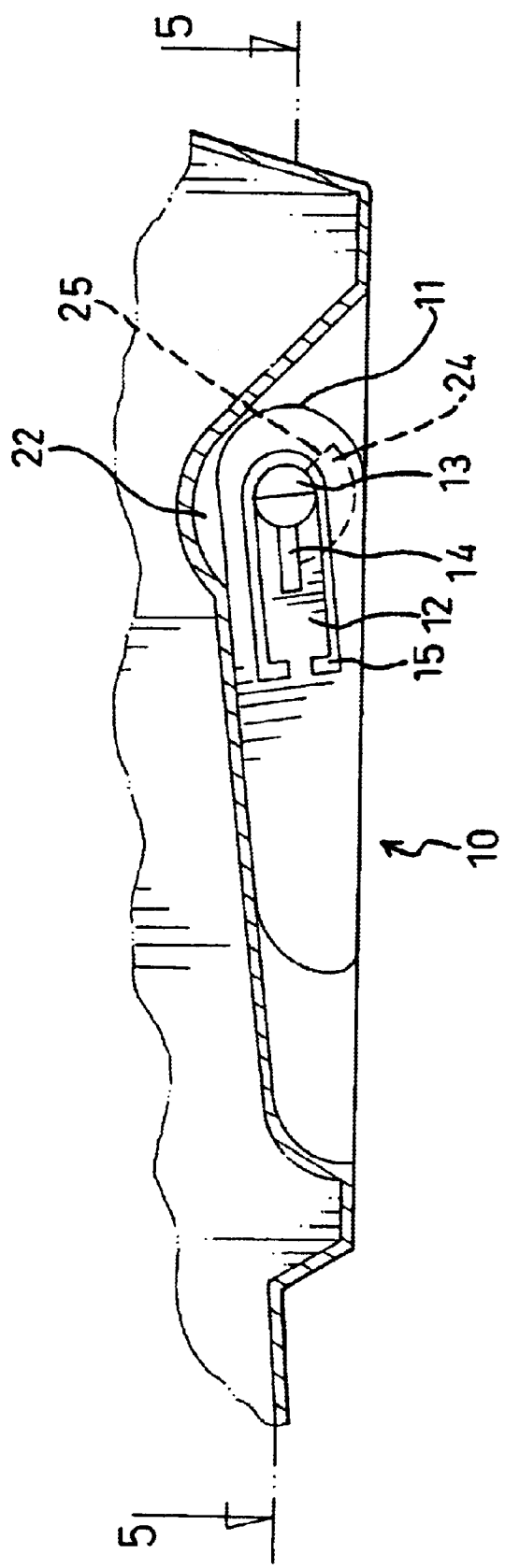
FIG. 3 is a schematic side view in partial section showing the relation between the protrusion and the sectorial boss.

With reference to FIG. 3, when the self-positioning device of the present invention is to be assembled, the two protrusions (13) are pressed toward each other by forcing the two corresponding resilient plates (12) to deform. Then the two protrusions (13) are inserted into a corresponding one of the through holes (23). After the two protrusions (13) are inserted into the corresponding through holes (23), the recoil force of the resilient plates (12) secures the leg (10) relative to the base (20).

Figure 4:
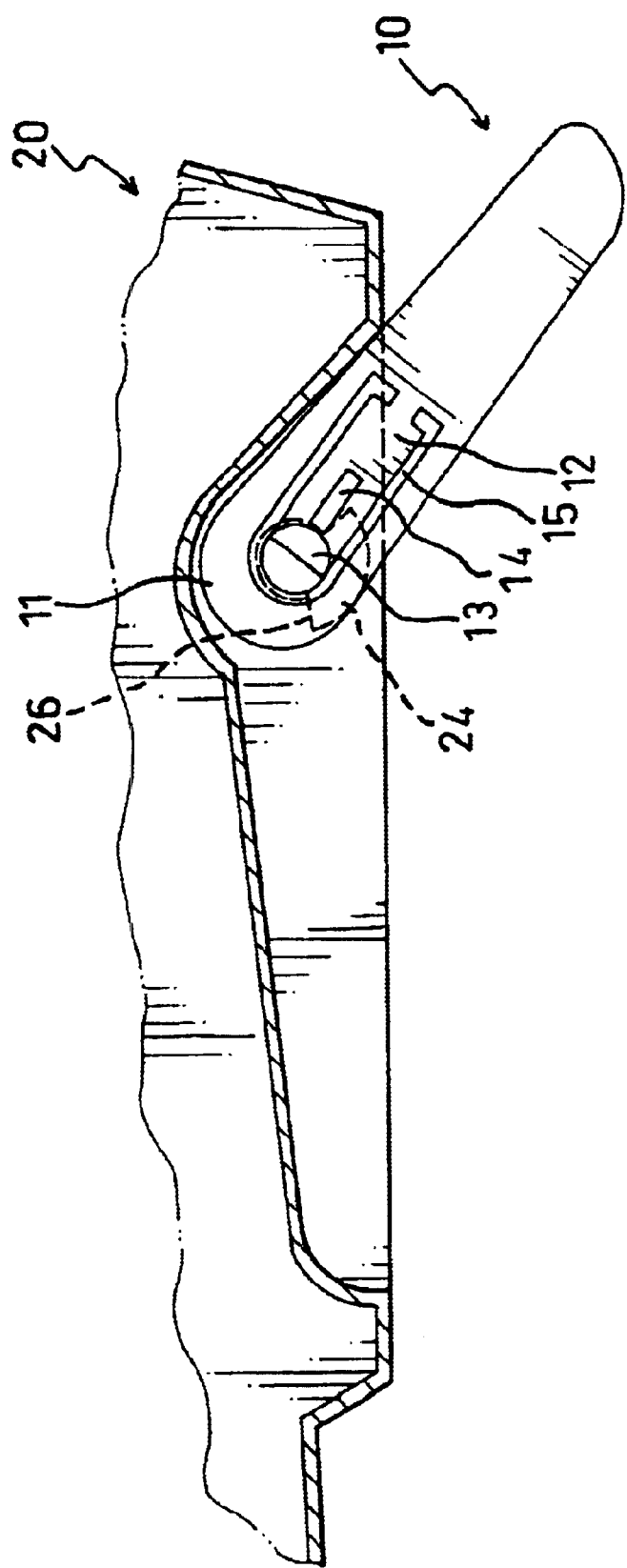
FIG. 4 is a schematic view showing the relative position of the stop relative to the sectorial boss when the leg is in pivotal movement.

With reference to FIG. 4 and still taking FIG. 3 for reference, when the self-positioning device of the present invention is not in use, the stop (14) abuts the second edge (26), which holds the leg (10) in the recessed seat (21), a first position of the stops (14). However, when the leg (10) pivots relative to the base (20), the two stops (14) of the leg (10) slide over the two corresponding sectorial bosses (24) and then stay in a second position abutting the first edges (25) of the sectorial bosses (24) respectively.

Figure 5:
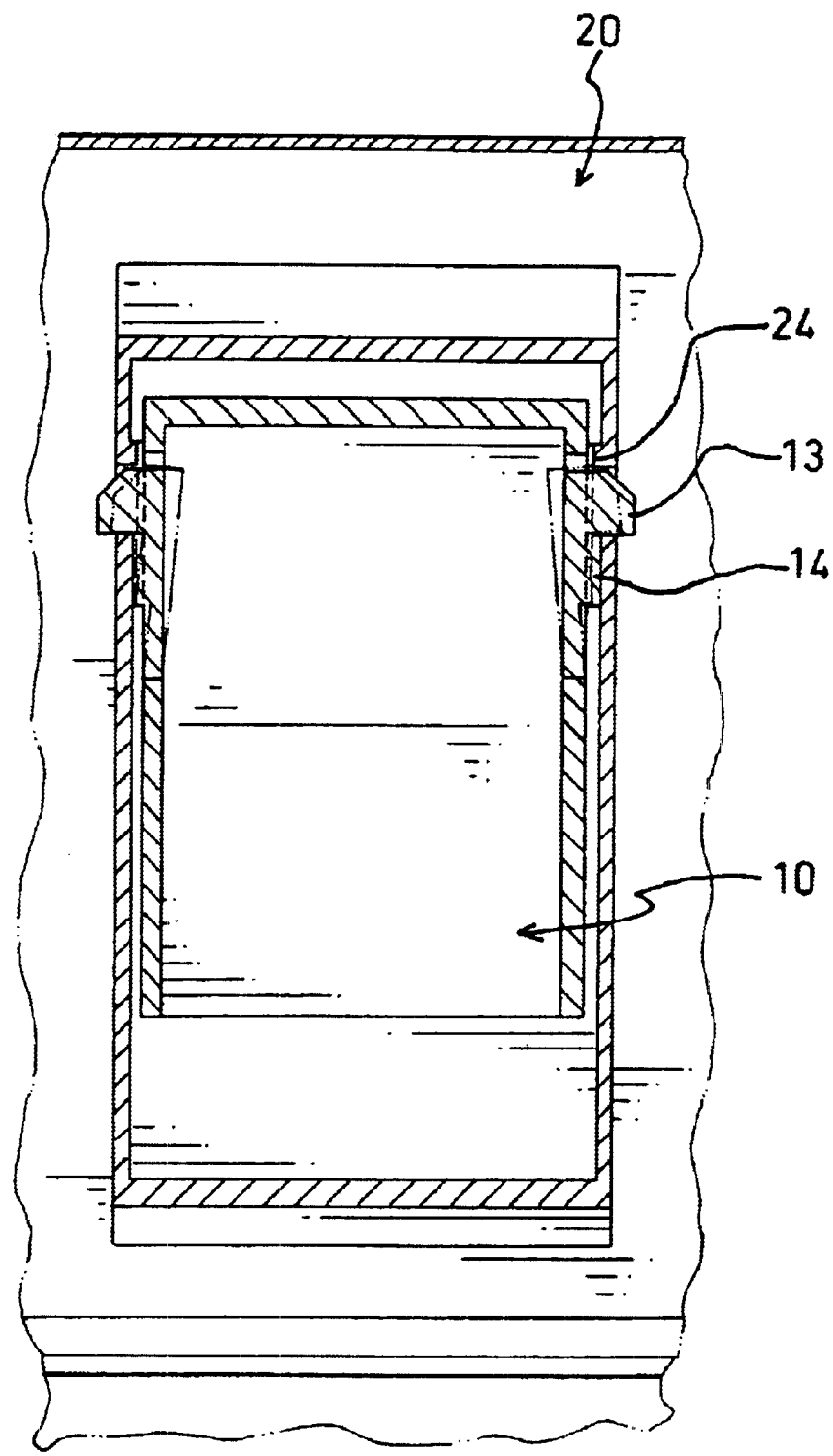
FIG. 5 is a schematic cross sectional view showing the relative position of the protrusions relative to the base after the leg is mounted with the base.
Figure 6:
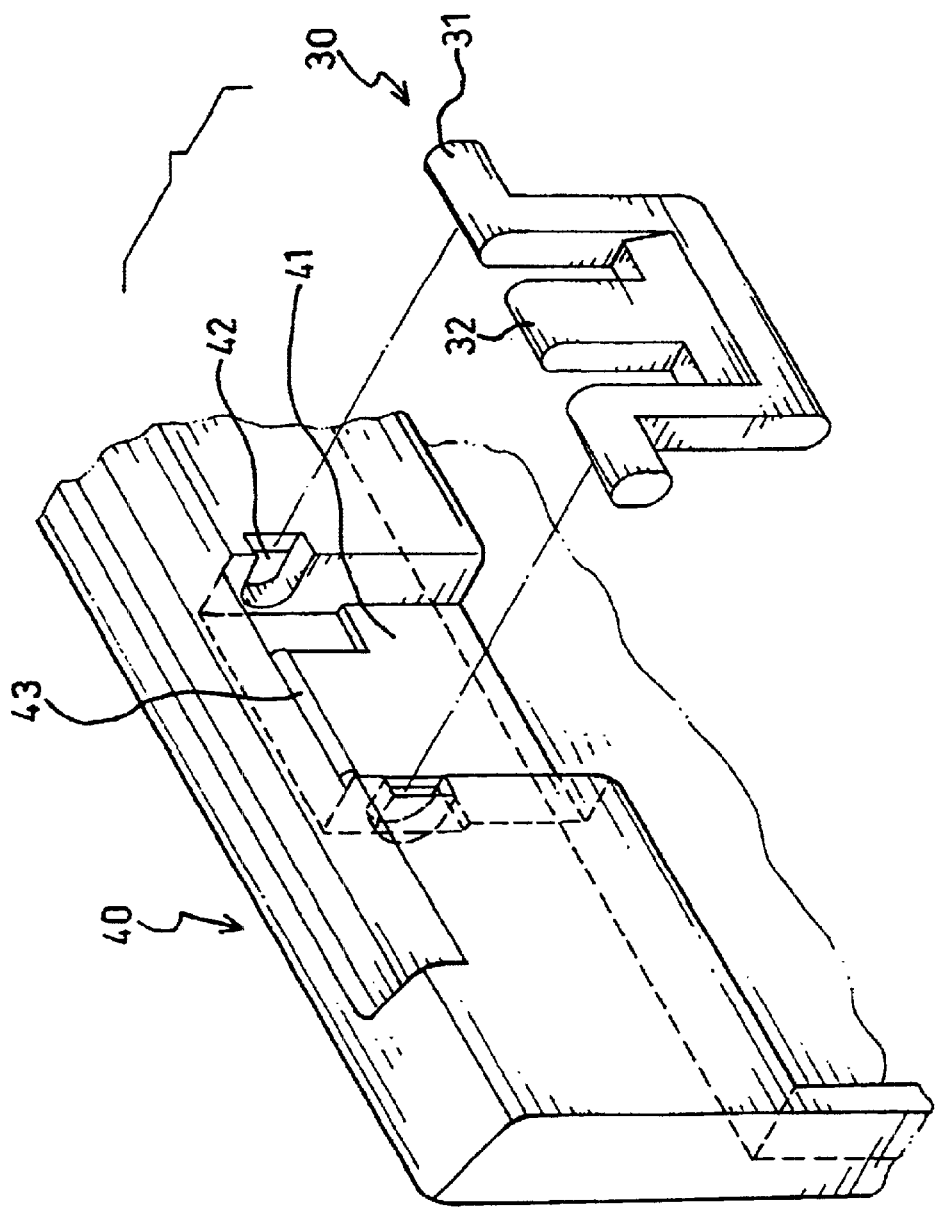
FIG. 6 is an exploded perspective view of a conventional positioning device for a keyboard.
Figure 7:
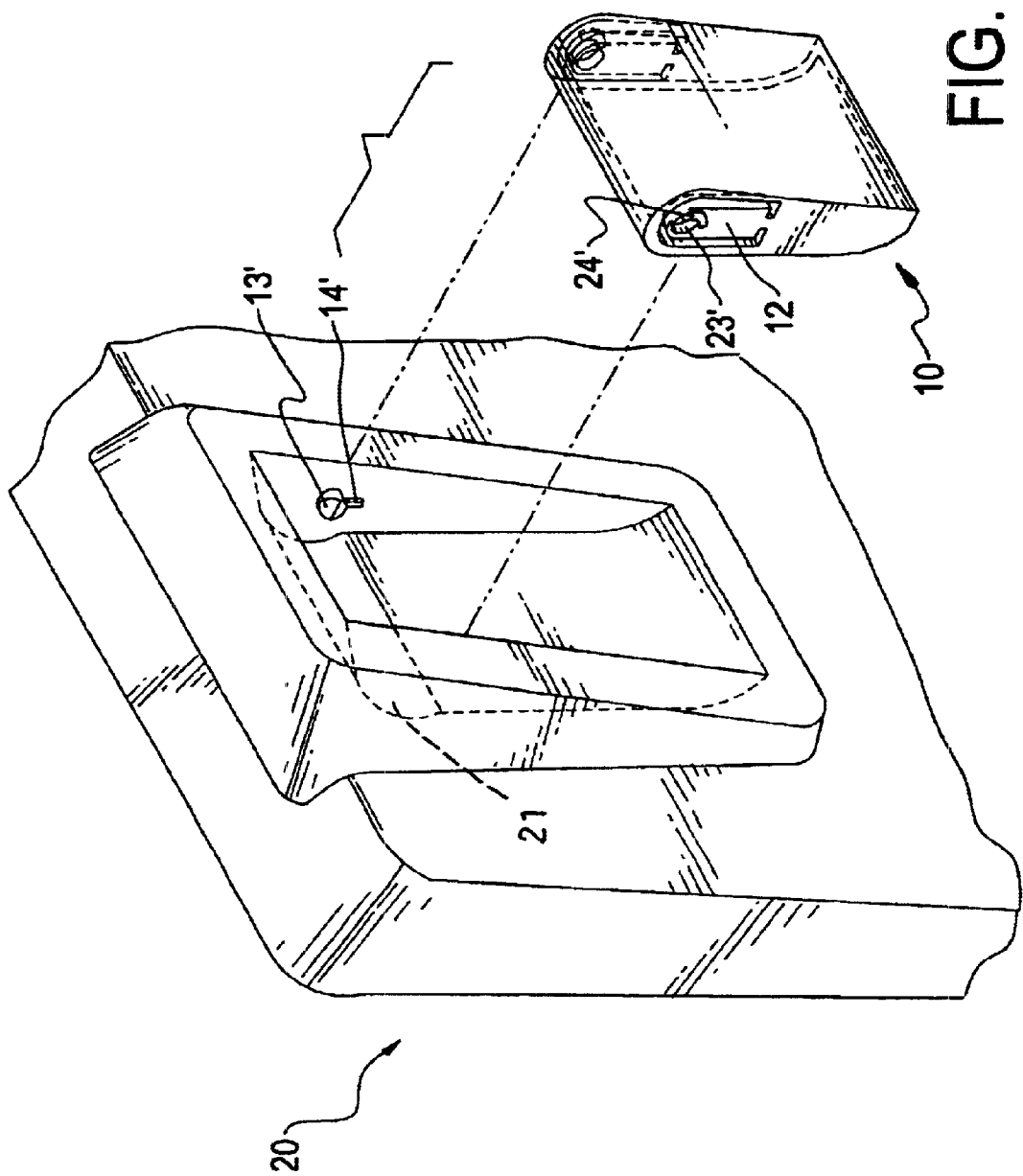
FIG. 7 is a perspective view of a self-positioning device for a keyboard comprising two protrusions formed on opposite sides of a corresponding one of the two recessed seats; two stops each formed on a protrusion; and two sectorial bosses formed on a corresponding one of the legs.

It is notable from FIG. 5 that during deformation of the resilient plates (12), due to the stops (14) sliding over the sectorial bosses (24), the recoil force of the resilient plates (12) is able to snap the respective stop (14) to abut the first or the second edge (25, 26) respectively. Therefore, it is concluded that the self-positioning device of the present invention is able to snappingly fit the legs (10) either in the first position or the second position so that during the entire pivotal movement of the legs (10), the user is able to save effort pulling out the legs (10) from the folded position, the first position and then easily support the keyboard on a plan surface inclinedly by the stop (14) abutting the first edge (25).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A self-positioning device for a keyboard having a base with two recessed seats to respectively and pivotally receive therein a leg so as to support the keyboard on a plan surface horizontally or inclinedly, the self-positioning device comprising:

two protrusions respectively formed on opposite sides of a corresponding leg;

two stops each formed on a corresponding one of the protrusions; and two sectorial bosses respectively formed on a corresponding one of the recessed seats to correspond to the two protrusions, each sectorial boss having a first edge and a second edge to selectively abut a corresponding one of the two stops, whereby the selective abutting of the stops to the first and second edges enables support of the keyboard on a plan surface horizontally and inclinedly.

2. The self-positioning device as claimed in claim 1 further comprising two resilient plates each formed on opposite sides of the leg, wherein each of the two protrusions is formed on a corresponding one of the resilient plates.

3. The self-positioning device as claimed in claim 1 further comprising two through holes adapted to be defined in a corresponding one of the recessed seats to correspond to the two protrusions so as to allow extension of the two protrusions into the corresponding through holes.

4. The self-positioning device as claimed in claim 2 further comprising two through holes adapted to be defined in a corresponding one of the recessed seats to correspond to the two protrusions so as to allow extension of the two protrusions into the corresponding through holes.

5. A self-positioning device for a keyboard having a base with two recessed seats to respectively and pivotally receive therein a leg so as to support the keyboard on a plan surface horizontally or inclinedly, the self-positioning device comprising:

two protrusions respectively formed on opposite sides of a corresponding one of the two recessed seats;

two stops each formed on a corresponding one of the protrusions; and two sectorial bosses formed on a corresponding one of the legs to correspond to the two protrusions, each sectorial boss having a first edge and a second edge to selectively abut a corresponding one of the two stops, whereby the selective abutting of the stops to the first and second edges enables support of the keyboard on a plan surface horizontally and inclinedly.

6. The self-positioning device as claimed in claim 5 further comprising two resilient plates each formed on opposite sides of the leg, wherein each of the two sectorial bosses is formed on a corresponding one of the resilient plates.

7. The self-positioning device as claimed in claim 5 further comprising two through holes adapted to be defined in a corresponding one of the legs to correspond to the two protrusions so as to allow extension of the two protrusions into the corresponding through holes.

8. The self-positioning device as claimed in claim 6 further comprising two through holes adapted to be defined in a corresponding one of the legs to correspond to the two protrusions so as to allow extension of the two protrusions into the corresponding through holes.

* * * * *